J. DWYER & G H. BARBOUR,

Assignors to MICHIGAN STOVE COMPANY.

Culinary Attachment to Base-Burning Heating Stoves.

No. 8,101. Reissued Feb. 26, 1878.

Attest:
H. L. Quills
Chas Thurman.

Inventor:
J. Dwyer
Geo H. Barbour
By Atty
Thos S. Sprague

N. PETERS, PHOTO-LITHOGRAPHER, WASHINGTON, D. C.

UNITED STATES PATENT OFFICE.

JEREMIAH DWYER AND GEORGE H. BARBOUR, OF DETROIT, MICHIGAN, ASSIGNORS TO MICHIGAN STOVE COMPANY, OF SAME PLACE.

IMPROVEMENT IN CULINARY ATTACHMENTS TO BASE-BURNING HEATING-STOVES.

Specification forming part of Letters Patent No. 195,109, dated September 11, 1877; Reissue No. 8,101, dated February 26, 1878; filed December 8, 1878.

*To all whom it may concern:*

Be it known that we, JEREMIAH DWYER and GEORGE H. BARBOUR, of Detroit, in the county of Wayne and State of Michigan, have invented an Improvement in Culinary Attachments to Base-Burning Heating-Stoves, of which the following is a specification:

The nature of this invention relates to providing an attachable and detachable device to the top of the inclosed flue-case usually to be found projecting to the rear of the modern class of base-burning heating-stoves, thereby forming an additional chamber, and allowing a boiler-hole to be placed immediately over the pipe-collar of the stove proper, so that the heat escaping through said pipe-collar will circulate within said chamber, and impinge, to a large extent, against the bottom of the kettle before escaping through the pipe-collar of the attachment, said pipe-collar opening upward in the rear of the boiler-hole.

The invention consists in the peculiar construction and arrangement of the attachment, the same being adapted to inclose the pipe-collar proper of the stove, as more fully hereinafter set forth.

Figure 1:
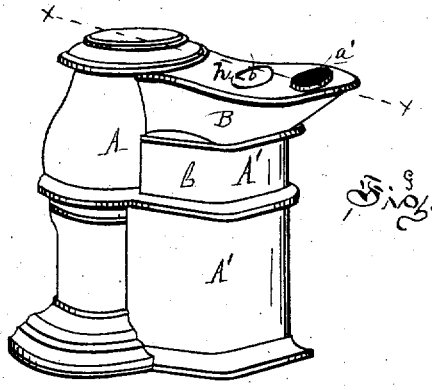
Figure 2:
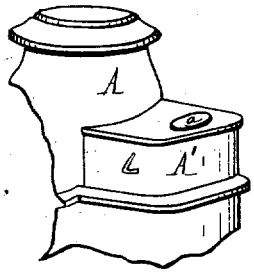
Figure 3:
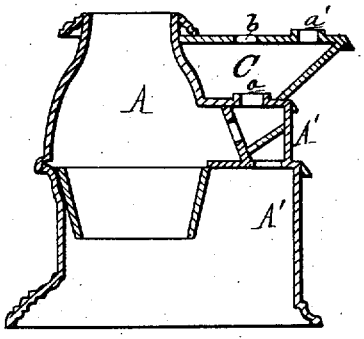

Figure 1 is a perspective view of our attachment as applied to a stove. Fig. 2 is a like view of that section of the stove where the attachment is to be applied for use. Fig. 3 is a longitudinal vertical section on the line *x x* in Fig. 1.

In the drawing, A represents the body of the ordinary base-burning heating-stove, provided with a flue-case, A′, at the back, terminating in an exit for the gases at the top, provided with the usual pipe-collar *a*. B is an attachment, closed at the top, back, and sides, and shaped to fit the body of the stove and rest upon the flue-case, which forms the bottom of the chamber C, within which the gases passing from the exit *a* of the stove circulate, and find an outlet through the collar-opening *a′* in the top of the attachment, and situated sufficiently to the rear to allow a boiler-hole, *b*, to be placed between said pipe-collar and the rear of the stove, and over, or nearly over, the pipe-collar *a*, so that the heated gases escaping therefrom will impinge, to a large extent, against the bottom of the boiler, which may be used before escaping through the collar *a′*. The boiler-hole is closed when not in use, by a cover, *h*, as shown in Fig. 1.

This attachment is light and cheap, and is intended to be made to fit any particular kind or style of heating-stove, to be sold with it, or subsequently, if the owner desires it.

We are aware that the escape-pipe of stoves has been curved downward, so as to allow of a pot-hole to be placed at the top of the concave; but that, having no chamber, the passage of the heated gases was too direct to be available for practical use, as the natural draft of the curved pipe was downward, tending to draw the heated gases away from impingement against the bottom of the boiler.

What we claim as our invention is—

1. The portable culinary attachment B, adapted to fit the back and flue-case or exit of a base-burning heating-stove, substantially as described.

2. In a portable culinary attachment adapted to fit the top of the rear vertical flue-inclosure of a base-burning heating-stove, the combination of the chamber C, the bottom and front of which are formed by the body of the stove, with usual exit *d* as an ingress-flue to said chamber and the exit-flue *a′* as an egress-flue, substantially as and for the purposes set forth.

3. In a base-burning heating-stove, and covering the top of the rear flue-inclosure thereof, a portable culinary attachment, having the bottom and one side of the chamber inclosed by it formed by the body of the stove, provided with a boiler-hole in its top, situated immediately, or nearly so, over the exit-flue of the stove when the attachment is in place and in front of the exit-flue of the attachment.

4. In a base-burning heating-stove, a portable culinary attachment, the front and bottom of which are formed by the body of the stove and the top of the flue-chamber, having an upward exit near the rear thereof, and a boiler-hole between such exit and the body of the stove, substantially as and for the purposes set forth.

JEREMIAH DWYER.
GEORGE H. BARBOUR.

Witnesses:
H. S. SPRAGUE,
A. L. HALL.